Patented Dec. 22, 1925.

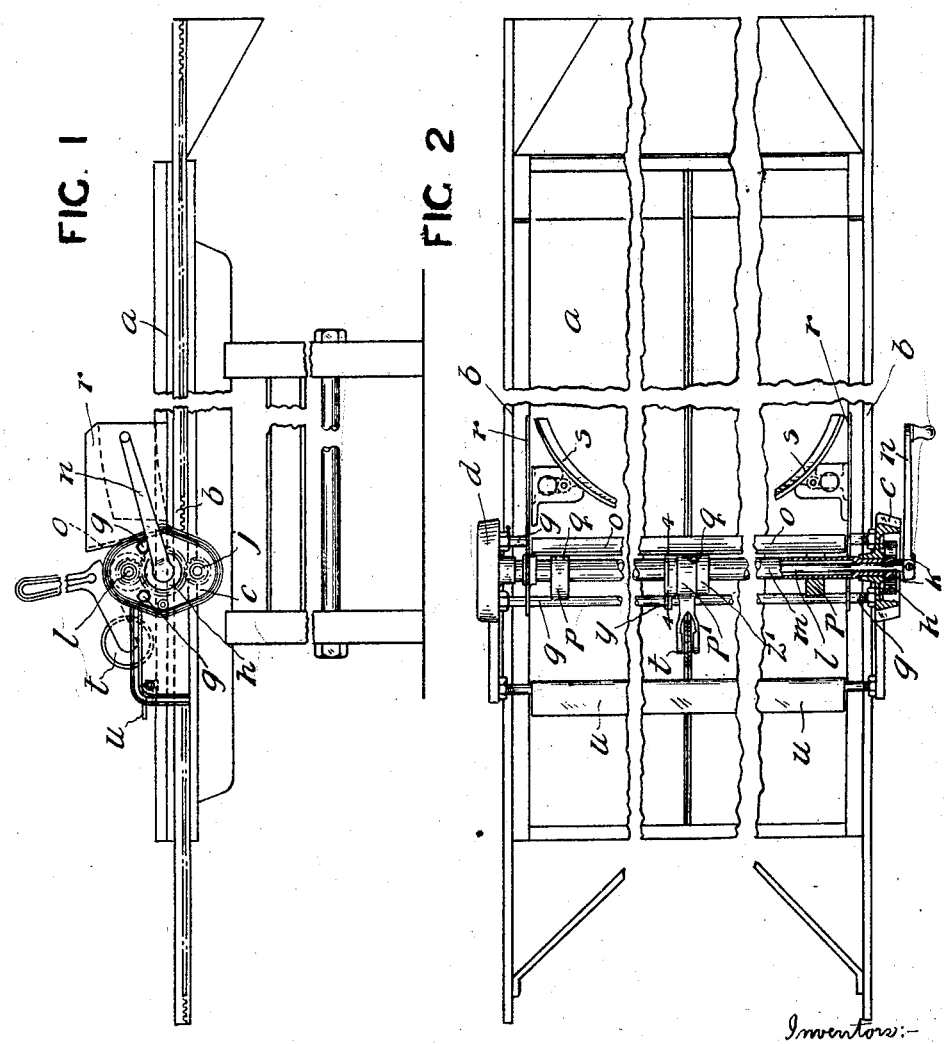

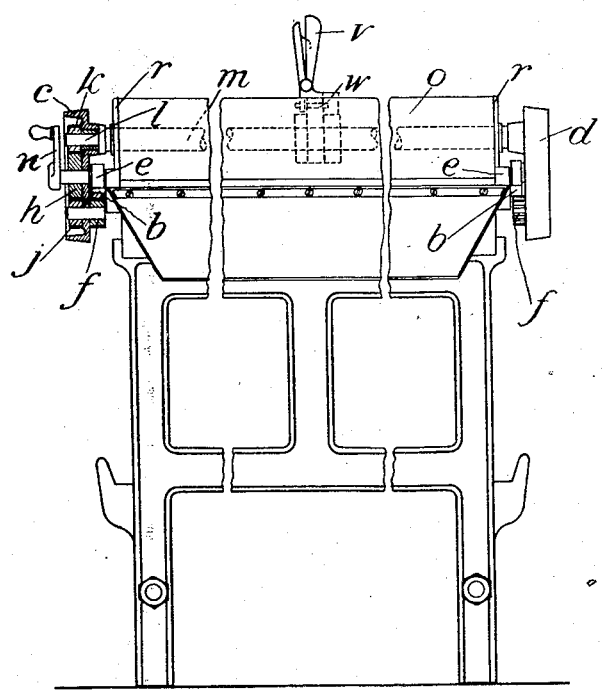
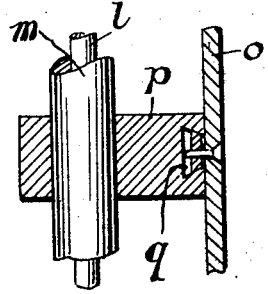
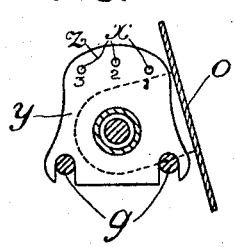

1,566,602

UNITED STATES PATENT OFFICE.

WILLIAM HOUNSELL, OF BIRMINGHAM, AND THOMAS CAREY FILLERY, OF HAWKS-HURST, ENGLAND.

APPARATUS FOR SPREADING MOLTEN TOFFEE OR OTHER LIKE SUBSTANCES TO A UNIFORM THICKNESS.

Application filed March 27, 1923. Serial No. 628,051.

*To all whom it may concern:*

Be it known that we, WILLIAM HOUNSELL, British subject, of Crosby Works, George Street, Parade, Birmingham, England, and THOMAS CAREY FILLERY, British subject, of Gladstone House, Hawkshurst, Kent, England, have invented certain new and useful Improvements in Apparatus for Spreading Molten Toffee or Other like Substances to a Uniform Thickness, of which the following is a specification.

This invention comprises new or improved means for equalizing the thickness of substances such as toffee, sugars, confectionery, and other substances, and these means preferably embody also means for cutting the substances into slabs of any desired size.

We will describe the invention in connection with toffee manufacture from which its application to other substances will be readily understood.

In this art it is well known to cool the sweetmeat after boiling it by pouring it onto a table or plane surface, over which it is spread. The table may be cooled by water circulated below it, but this is immaterial for the purpose of our invention.

The objects of our invention are to provide improved means in the form of an inclined blade for rapidly spreading the substance evenly over the table, or plane surface, so as to result in an equalized thickness in the mass when it has cooled and set; to enable the height of the spreading device to be adjusted so as to permit a desired thickness to be obtained; and to enable the substance to be readily cut up into slabs.

With these objects in view our invention comprises a table or bed having a surface on which the substance is poured, the table having racks along its sides, a carriage with pinions engaging the racks, and an adjustable spreader device on the carriage comprising an inclined blade adapted to engage the substance.

In the appended drawings we have illustrated a preferred embodiment of construction in which:—

Figure 1 is a side elevation.

Figure 2 is a plan view.

Figure 3 is a front elevation.

Figure 4 is a detail view on line 4—4 of Figure 2.

Figure 5 is a detail view showing the means for adjusting the height of the blade.

The figures shown have portions cut away for convenience of space.

In the embodiment shown, the table $a$ is provided along two opposite sides with a toothed rack $b$ with the teeth downwardly directed. The carriage in this case comprises two carrier plates $c$ and $d$, one at each side, on which are mounted rollers $e$ to travel on the backs of the racks and pinions $f$ in mesh with the racks. These two plates are rigidly connected across the table by a rod or rods $g$, and a gear wheel $h$ is arranged on each carrier plate in mesh with a pinion $j$ on the same axle as the rack pinion $f$ so as to drive the rack pinion. To enable both pinions $f$ to be driven from one side of the machine, a further pinion $k$ is provided on each carrier plate in mesh with the gear wheel $h$, and these two pinions $k$ are connected across the table by a shaft $l$ preferably carried through a sleeve $m$ which is secured at its two ends to the two plates.

By means of a crank handle $n$ engaged with the spindle of the gear wheel $h$ on either side of the machine, the carriage may be traversed along the racks and consequently along the table. Power may be employed for traversing the table, if desired, or an electric motor mounted on the carriage may be employed.

As one example of a spreading or levelling device, we mount a metal blade $o$, preferably a mercurized blade presenting a horizontal lower edge, by one or more clips $p$ upon the sleeve $m$ aforesaid. The clip or clips $p$ are free to turn around the sleeve and, if desired, the front of the clip may have a dovetail groove $q$, and a block on the back of the blade may engage therein and be secured by a set pin at any desired level with respect to the clip so as to adjust the height of the horizontal bottom edge of the blade from the table.

The blade is preferably backwardly raked or inclined from its lower spreading edge, and at each end a plate $r$ is secured at right angles so as to close the ends and prevent the substance which climbs up the blade from falling off the table.

We can also mount adjustably in front of the blade a deflector $s$ at each side to prevent the substance accumulating at these points and overflowing. The deflectors would be intended to guide the material toward the middle of the table. Preferably they are hinged so as to be capable of being swung out of the way for cleaning purposes.

To the rear of the blade we preferably mount on the carriage, in an adjustable manner, one or more knives which may conveniently be in the form of wheel cutters $t$. These are intended for cutting the toffee on the table into strips after it has been levelled and is in a suitable condition for cutting.

These knives can be put out of action when the levelling process is being carried out, and may be lowered into operative position in any suitable manner as for example by rocking the clip $p'$ which carries the levelling blade $o$ so as to raise the latter and lower the "slabbing" blades. For this purpose the clip $p'$ is formed with a projecting handle $v$ having a spring detent $w$ engaging holes $x$ in a boss $y$ on a collar $z$ as shown in Fig. 4 of the drawings. The collar $z$ is supported on the rods $g$, and on the other side of the clip $p'$ is preferably disposed a collar $z'$. The spring detent engages the hole 1 when the blade $o$ is in working position and the hole 3 when the cutter is in working position, while the hole 2 is for the neutral position.

If desired, we may arrange a guide bar $u$ at the back of the carriage to form a straight edge to enable a hand knife to be run across the toffee transversely to complete the slab cutting. In this case an adjustable stop or catch device might be employed on the carriage and the table tracks to enable it to be located in various positions where the lateral cuts have to be made.

With the device in use the substance is poured over the table, directly it leaves the boiling pan, in any suitable manner, and while plastic or semi-plastic and warm, the leveling blade is traversed along the table equalizing the mass thereon, after which the mass undergoes further treatments, such as marking into slabs, cutting or the like before it is finally allowed to cool on the table and set hard.

Amongst the advantages of the invention, in addition to the great saving in labour and the improvement of the form and finish of the product, are the following:—the slabs being accurately gauged to thickness, the weight of slabs or pieces of corresponding size is uniform and the sealing operations are facilitated, further, machine-wrapping difficulties hitherto experienced owing to the irregularities of thckness are eliminated.

We claim:—

1. Apparatus for spreading molten toffee and other like substances to a uniform thickness, comprising a table with a plane surface on which the substance is delivered, toothed racks along said table, a carriage with pinions for engaging said racks, and an adjustable spreader on said carriage in the form of an inclined blade for engaging the substance on the table and levelling it as the blade is moved along the table by the carriage.

2. Apparatus for spreading molten toffee and other like substances to a uniform thickness, comprising a table with a plane surface on which the substance is delivered, toothed racks along said table, said racks having their teeth downwardly directed, a carriage across said table with pinions at each side to engage said racks and with supporting rollers running on the back of said racks; and an adjustable spreader blade on said carriage for engaging and levelling the substance on said table.

3. Apparatus for spreading molten toffee and other like substances to a uniform thickness, comprising a table with a plane surface on which the substance is delivered, downwardly directed toothed racks along said table, a travelling carriage arranged across said table and comprising carrier plates at each side, rods for rigidly connecting the carrier plates across the table, a supporting roller on each carrier plate bearing on the back of the toothed racks, a gear wheel and a pinion in mesh therewith in each carrier plate, means for rotating said gear wheel, an axle connecting the said pinion to a pinion engaging said rack and an inclined blade on said carriage for engaging and spreading the substance placed on said table.

4. Apparatus for spreading molten toffee and other like substances to a uniform thickness, comprising a table with a plane surface on which the substance is delivered, downwardly directed toothed racks along said table, a travelling carriage arranged across said table and comprising carrier plates at each side, rods for rigidly connecting the carrier plates across the table, a supporting roller on each carrier plate bearing on the back of the toothed racks, a gear wheel and a pinion in mesh therewith in each carrier plate, means for rotating said gear wheel, an axle connecting the said pinion to a pinion engaging said rack, a second pinion in mesh with each gear wheel, a shaft connecting said second pinions across the table so as to drive said gear wheels and rack pinions from one side of the table, and an inclined blade on said carriage for engaging and spreading the substance placed on said table.

5. Apparatus for spreading molten toffee and other like substances to a uniform thickness, comprising a table with a plane surface on which the substance is delivered, racks along the sides of the said table, a carriage across the table travelling along said racks, an inclined spreader blade on said carriage, for engaging the substance on the table, means for driving both sides of said carriage, a shaft connecting the driving means for both sides of the carriage across the table, a sleeve around said shaft, said sleeve being secured at its two ends to the carriage, and carrying said inclined blade.

6. Apparatus for spreading molten toffee and other like substances to a uniform thickness, comprising a table with a plane surface on which the substance is delivered, racks on said table, a traversing carriage thereon, carrier plates forming part of said traversing carriage, a rod or rods connecting the carrier plates across the table, a gear wheel and pinion on each carrier plate a second pinion in mesh with the gear wheel in each carrier plate, a shaft connecting said second pinions across the table, a sleeve around the shaft said sleeve being secured at its two ends to the said carrier plates, clips on said sleeve said clips being freely mounted thereon, a spreader blade secured to said clips in an inclined manner, and means for locating said clips with respect to said sleeve.

7. Apparatus for spreading molten toffee and other like substances to a uniform thickness, comprising a table with a plane surface on which the substance is delivered, racks on said table, a traversing carriage thereon, carrier plates forming parts of said traversing carriage a rod or rods connecting the carrier plates across the table, a gear wheel and pinion on each carrier plate a second pinion in mesh with the gear wheel in each carrier plate, a shaft connecting said second pinions across the table, a sleeve around the shaft said sleeve being secured at its two ends to the said carrier plates, clips on said sleeve, a spreader blade secured to said clips in an inclined manner, a horizontal lower edge on the blade and forwardly directed deflector plates at each end of the blade.

8. Apparatus for spreading molten toffee and other like substances to a uniform thickness, comprising a table with a plane surface on which the substance is delivered, racks on said table, a traversing carriage thereon, carrier plates on said traversing carriage a rod or rods connecting the carrier plates across the table, a gear wheel and pinion on each carrier plate a second pinion in mesh with the gear wheel in each carrier plate, a shaft connecting said second pinions across the table, a sleeve around the shaft said sleeve being secured at its two ends to the said carrier plates, clips on said sleeve said clips being freely mounted thereon, a spreader blade secured to said clips in an inclined manner, cutters on said clips, means for locating said clips on said sleeve, said means automatically putting the blade out of action when the cutters are put in action.

In testimony whereof we affix our signatures.

WILLIAM HOUNSELL.
THOMAS CAREY FILLERY.